United States Patent
Ananthakrishan et al.

(10) Patent No.: US 8,954,770 B2
(45) Date of Patent: *Feb. 10, 2015

(54) CONTROLLING TEMPERATURE OF MULTIPLE DOMAINS OF A MULTI-DOMAIN PROCESSOR USING A CROSS DOMAIN MARGIN

(75) Inventors: Avinash N. Ananthakrishan, Hillsboro, OR (US); Tomer Ziv, Rishon Lezion (IL); Doron Rajwan, Rishon Le-Zion (IL); Efraim Rotem, Haifa (IL)

(73) Assignee: Intel Corporation, Santa Clara, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 13/247,580

(22) Filed: Sep. 28, 2011

(65) Prior Publication Data

US 2013/0080804 A1    Mar. 28, 2013

(51) Int. Cl.
  *G06F 1/26* (2006.01)
  *G06F 1/32* (2006.01)
  *G06F 1/20* (2006.01)

(52) U.S. Cl.
  CPC .............. *G06F 1/3234* (2013.01); *G06F 1/206* (2013.01); *G06F 1/324* (2013.01)
  USPC ........................................................ 713/320

(58) Field of Classification Search
  CPC ..... G06F 1/206; G06F 9/30083; G06F 1/324; G06F 1/3234
  USPC ......................................................... 713/320
  See application file for complete search history.

(56) References Cited

U.S. PATENT DOCUMENTS

| | | | |
|---|---|---|---|
| 5,163,153 A | 11/1992 | Cole et al. | |
| 5,287,292 A * | 2/1994 | Kenny et al. | ............... 702/132 |
| 5,522,087 A | 5/1996 | Hsiang | |
| 5,590,341 A | 12/1996 | Matter | |
| 5,621,250 A | 4/1997 | Kim | |
| 5,931,950 A | 8/1999 | Hsu | |
| 6,748,546 B1 | 6/2004 | Mirov et al. | |

(Continued)

FOREIGN PATENT DOCUMENTS

| | | |
|---|---|---|
| CN | 101351759 | 1/2009 |
| CN | 101403944 | 4/2009 |

(Continued)

OTHER PUBLICATIONS

U.S. Appl. No. 13/282,947, filed Oct. 27, 2011, entitled "Controlling Operating Frequency of a Core Domain Via a Non-Core Domain of a Multi-Domain Processor," by Avinash N. Ananthakrishnan, et al.

(Continued)

*Primary Examiner* — Thomas Lee
*Assistant Examiner* — Danny Chan
(74) *Attorney, Agent, or Firm* — Trop, Pruner & Hu, P.C.

(57) ABSTRACT

In one embodiment, the present invention includes a method for determining, in a controller of a multi-domain processor, whether a temperature of a second domain of the multi-domain processor is greater than a sum of a throttle threshold and a cross-domain margin, and if so, reducing a frequency of a first domain of the multi-domain processor by a selected amount. In this way, a temperature of the second domain can be allowed to reduce, given a thermal coupling of the domains. Other embodiments are described and claimed.

14 Claims, 4 Drawing Sheets

(56) References Cited

U.S. PATENT DOCUMENTS

| | | | |
|---|---|---|---|
| 6,792,392 B1 | 9/2004 | Knight | |
| 6,823,516 B1 | 11/2004 | Cooper | |
| 6,829,713 B2 | 12/2004 | Cooper et al. | |
| 6,908,227 B2* | 6/2005 | Rusu et al. | 374/141 |
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,146,514 B2 | 12/2006 | Kaushik et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,574,321 B2 | 8/2009 | Kernahan et al. | |
| 7,596,464 B2* | 9/2009 | Hermerding et al. | 702/99 |
| 7,603,577 B2 | 10/2009 | Yamaji et al. | |
| 7,624,215 B2 | 11/2009 | Axford et al. | |
| 7,730,340 B2 | 6/2010 | Hu et al. | |
| 7,752,467 B2 | 7/2010 | Tokue | |
| 7,797,512 B1 | 9/2010 | Cheng et al. | |
| 7,966,511 B2 | 6/2011 | Naveh et al. | |
| 8,015,427 B2 | 9/2011 | Miller et al. | |
| 8,601,288 B2 | 12/2013 | Brinks et al. | |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0030940 A1* | 2/2004 | Espinoza-Ibarra et al. | 713/300 |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0046400 A1 | 3/2005 | Rotem | |
| 2005/0132238 A1 | 6/2005 | Nanja | |
| 2005/0223258 A1 | 10/2005 | Watts | |
| 2005/0288886 A1* | 12/2005 | Therien et al. | 702/130 |
| 2006/0006166 A1* | 1/2006 | Chen et al. | 219/494 |
| 2006/0041766 A1* | 2/2006 | Adachi | 713/322 |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0101174 A1 | 5/2007 | Tsukimori et al. | |
| 2007/0106428 A1* | 5/2007 | Omizo et al. | 700/300 |
| 2007/0106827 A1 | 5/2007 | Boatright et al. | |
| 2007/0156992 A1 | 7/2007 | Jahagirdar | |
| 2007/0168151 A1* | 7/2007 | Kernahan et al. | 702/132 |
| 2007/0214342 A1 | 9/2007 | Newburn | |
| 2007/0234083 A1 | 10/2007 | Lee | |
| 2007/0239398 A1 | 10/2007 | Song et al. | |
| 2007/0245163 A1 | 10/2007 | Lu et al. | |
| 2007/0260895 A1* | 11/2007 | Aguilar et al. | 713/300 |
| 2008/0005603 A1 | 1/2008 | Buch et al. | |
| 2008/0028240 A1 | 1/2008 | Arai et al. | |
| 2008/0028778 A1 | 2/2008 | Millet | |
| 2008/0077282 A1* | 3/2008 | Hartman et al. | 700/300 |
| 2008/0077813 A1 | 3/2008 | Keller et al. | |
| 2008/0136397 A1 | 6/2008 | Gunther et al. | |
| 2008/0250260 A1 | 10/2008 | Tomita | |
| 2008/0307240 A1 | 12/2008 | Dahan et al. | |
| 2009/0006871 A1 | 1/2009 | Liu et al. | |
| 2009/0070605 A1 | 3/2009 | Nijhawan et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2009/0235108 A1* | 9/2009 | Gold et al. | 713/500 |
| 2009/0271141 A1 | 10/2009 | Coskun et al. | |
| 2009/0271646 A1 | 10/2009 | Talwar et al. | |
| 2009/0313489 A1 | 12/2009 | Gunther et al. | |
| 2010/0058078 A1 | 3/2010 | Branover et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2010/0250856 A1 | 9/2010 | Owen et al. | |
| 2010/0332927 A1 | 12/2010 | Kurts et al. | |
| 2011/0022865 A1 | 1/2011 | Gunther et al. | |
| 2011/0072429 A1 | 3/2011 | Celeskey et al. | |
| 2011/0093733 A1 | 4/2011 | Kruglick | |
| 2011/0154090 A1 | 6/2011 | Dixon et al. | |
| 2011/0283124 A1 | 11/2011 | Branover et al. | |
| 2012/0053897 A1 | 3/2012 | Naffziger | |
| 2012/0066535 A1* | 3/2012 | Naffziger | 713/300 |
| 2012/0096288 A1 | 4/2012 | Bates et al. | |
| 2012/0110352 A1* | 5/2012 | Branover et al. | 713/300 |
| 2012/0114010 A1* | 5/2012 | Branch | 374/100 |
| 2012/0116599 A1 | 5/2012 | Arndt et al. | |
| 2012/0173907 A1 | 7/2012 | Moses et al. | |
| 2013/0173941 A1 | 7/2013 | Ananthakrishnan | |
| 2013/0246825 A1 | 9/2013 | Shannon | |

FOREIGN PATENT DOCUMENTS

| | | |
|---|---|---|
| CN | 101010655 | 5/2010 |
| EP | 1 282 030 A1 | 5/2003 |
| KR | 10-2006-012846 | 12/2006 |
| TW | I342498 | 5/2011 |
| TW | I344793 | 7/2011 |

OTHER PUBLICATIONS

U.S. Appl. No. 13/285,414, filed Oct. 31, 2011, entitled "Controlling a Turbo Mode Frequency of a Processor," by Avinash N. Ananthakrishnan, et al.

U.S. Appl. No. 13/225,677, filed Sep. 6, 2011, entitled "Dynamically Allocating a Power Budget Over Multiple Domains of a Processor," by Avinash N. Ananthakrishnan, et al.

U.S. Appl. No. 13/285,465, filed Oct. 31, 2011, entitled "Dynamically Controlling Cache Size to Maximize Energy Efficiency," by Avinash N. Ananthakrishnan, et al.

U.S. Appl. No. 13/282,896, filed Oct. 27, 2011, entitled "Enabling a Non-Core Domain to Control Memory Bandwidth," by Avinash N. Ananthakrishnan, et al.

U.S. Appl. No. 12/889,121, "Providing Per Core Voltage and Frequency Control," filed Sep. 23, 2010, by Pakaj Kumar.

SPEC—Power and Performance, Design Overview V1.10, Standard Performance Information Corp., Oct. 21, 2008, 6 pages.

U.S. Appl. No. 13/070,700, "Obtaining Power Profile Information With Low Overhead," filed Mar. 24, 2011, by Robert Knight.

Anoop Iyer, et al., "Power and Performance Evaluation of Globally Asynchronous Locally Synchronous Processors," 2002, pp. 1-11.

Greg Semeraro, et al., "Hiding Synchronization Delays In A GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

(56) References Cited

OTHER PUBLICATIONS

L. Benini, et al., "System-Level Dynamic Power Management," 1999, pp. 23-31.
Ravindra Jejurikar, et al., "Leakage Aware Dynamic Voltage Scaling For Real-Time Embedded Systems," 2004, pp. 275-280.
Ravindra Jejurikar, et al., "Dynamic Slack Reclamation With Procrastination Scheduling In Real-Time Embedded Systems," 2005, pp. 13-17.
R. Todling, et al., "Some Strategies For Kalman Filtering and Smoothing," 1996, pp. 1-21.
R.E. Kalman, "A New Approach To Linear Filtering and Prediction Problems," 1960, pp. 1-12.
Intel Technology Journal, "Power and Thermal Management in the Intel Core Duo Processor," May 15, 2006, pp. 109-122.
Intel Developer Forum, IDF2010, Opher Kahn, et al., "Intel Next Generation Microarchitecture Codename Sandy Bridge: New Processor Innovations," Sep. 13, 2010, 58 pages.
David L. Hill, et al., "The Uncore: A Modular Approach To Feeding The High-Performance Cores," Intel Technology Journal, 2010, vol. 14, Issue 3, pp. 30-49.
International Searching Authority, "Notification of Transmittal of the International Search Report and the Written Opinion of the International Searching Authority," mailed Feb. 28, 2013, in International application No. PCT/US2012/055943.
U.S. Patent and Trademark Office, Office Action mailed Jul. 31, 2014, in U.S. Appl. No. 13/247,564.
U.S. Patent and Trademark Office, Office Action mailed Jan. 16, 2014, with Reply filed Apr. 9, 2014, in U.S. Appl. No. 13/247,564.
U.S. Patent and Trademark Office, Office Action mailed Jun. 6, 2014, with Reply filed Sep. 4, 2014, in U.S. Appl. No. 13/282,947.
U.S. Patent and Trademark Office, Office Action mailed May 16, 2014, with Reply filed Aug. 12, 2014, in U.S. Appl. No. 13/285,414.
U.S. Patent and Trademark Office, Office Action mailed Aug. 18, 2014, in U.S. Appl. No. 13/285,465.

\* cited by examiner

CONTROLLING TEMPERATURE OF MULTIPLE DOMAINS OF A MULTI-DOMAIN PROCESSOR USING A CROSS DOMAIN MARGIN

BACKGROUND

As technology advances in the semiconductor field, devices such as processors incorporate ever-increasing amounts of circuitry. Over time, processor designs have evolved from a collection of independent integrated circuits (ICs), to a single integrated circuit, to multicore processors that include multiple processor cores within a single IC package. As time goes on, ever greater numbers of cores and related circuitry are being incorporated into processors and other semiconductors.

Multicore processors are being extended to include additional functionality by incorporation of other functional units within the processor. Typically, a multicore processor has a common power budget and a common thermal budget. The power budget is set so that a specified power level, at least as averaged over time, is not exceeded. The thermal budget is set such that a thermal throttle point, which is a highest allowable temperature at which the processor can safely operate, is not exceeded. Although these common budgets exist, mechanisms to adaptively share the budgets across the wide variety of circuitry present in a processor does not exist.

DETAILED DESCRIPTION

In various embodiments, a processor having multiple independent domains can be controlled to prevent a temperature of any of the domains from exceeding a maximum junction temperature of the processor. As used herein, the term "maximum junction temperature" is a highest temperature at which a semiconductor product is specified to be fully operational. As an example, this temperature can be determined during device characterization, both during manufacture as well as testing in a laboratory environment, and stored in a non-volatile storage of the device. In general, various circuitry of a processor or other product may be present to provide a throttling mechanism such that the processor is prevented from operating above this maximum junction temperature.

Examples described herein are in connection with a multicore processor including multiple processor cores and one or more other processing engines. For example, in a particular embodiment described herein, at least two independent domains may be present, namely a core domain that includes one or more cores and a graphics domain that includes one or more graphics engines. As used herein the term "domain" is used to mean a collection of hardware and/or logic that operates at the same voltage and frequency point. As an example, a multicore processor can further include other non-core processing engines such as fixed function units, graphics engines, and so forth. Such processor can include at least two independent domains, one associated with the cores (referred to herein as a core domain) and one associated with a graphics engine (referred to herein as a graphics domain). Although many implementations of a multi-domain processor can be formed on a single semiconductor die, other implementations can be realized by a multi-chip package in which different domains can be present on different semiconductor die of a single package.

In various embodiments, cross-domain effects with regard to temperature, such that an increased temperature of one domain has an effect on the temperature of another domain can be considered and taken into account in controlling temperature of each domain. More specifically, embodiments may provide a programmable temperature margin parameter, referred to herein as a "cross-domain margin," that is used to determine a marginal temperature level above a throttle temperature on a first domain at which a power consumption level of a different domain is to be reduced in order to allow the first domain temperature to begin cooling. This cross-domain margin may apply even if the power consumption of the different domains does not change over time. As with the throttle points, the cross-domain margin can be stored in a non-volatile storage of the processor.

Figure 1:
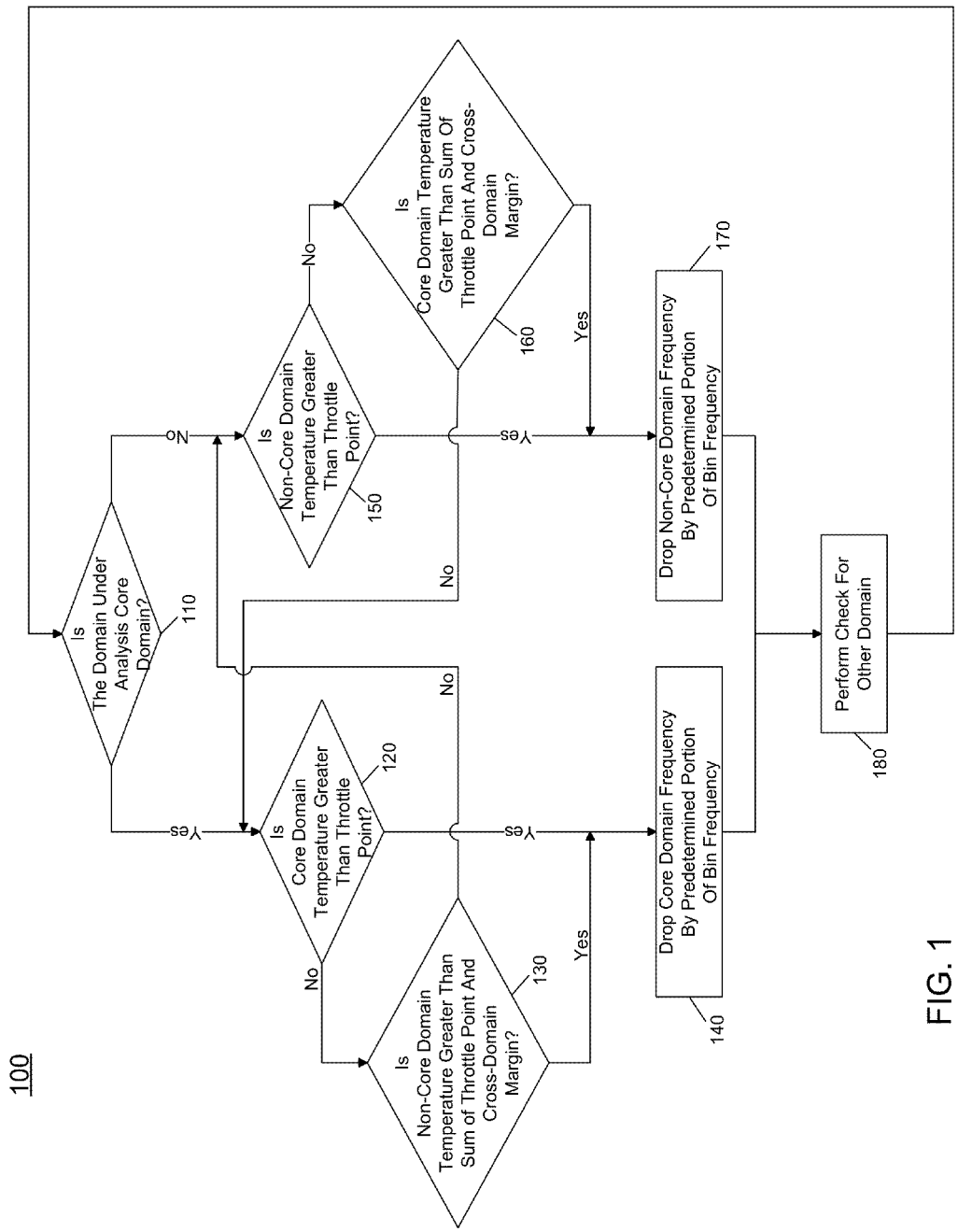
FIG. 1 is a flow diagram of a method in accordance with an embodiment of the present invention.

Embodiments may be performed in various locations. As one example, logic of a power control unit (PCU) of a processor can be used to perform the thermal analysis and temperature control in accordance with an embodiment of the present invention. Referring now to FIG. 1, shown is a flow diagram of a method in accordance with an embodiment of the present invention. Method 100 of FIG. 1 may be performed by thermal logic of a PCU, in one embodiment, and can be performed on an iterative basis, namely once per predetermined interval (which may be approximately 1 millisecond (ms) in one embodiment). In general, the method may be performed based on a temperature of multiple domains of a processor. Such temperature information can be obtained directly from the domains, e.g., from a thermal sensor associated with each domain that is coupled to the PCU, e.g., via a push bus. Or, temperature information can be determined within the PCU, e.g., based on thermal sensor data obtained from these thermal sensors.

Method 100 may begin by determining the appropriate domain under review. Thus at diamond 110 it can be determined whether the domain under review is a core domain. The embodiment of FIG. 1 is for a multi-domain processor including two domains, namely a core domain that includes one or more processor cores and a non-core domain, which in a particular embodiment can be a graphics domain that includes one or more graphics engines. Of course, this method can be extended to a product having more than two domains that can share a common thermal (and power) budget. If it is determined that the domain under review is a core domain, control passes to diamond 120.

At diamond 120 it can be determined whether the temperature of the core domain is greater than a throttle point. Although the scope of the present invention is not limited in this regard, in some embodiments this throttle point may correspond to a maximum junction temperature (or Tj) at which a given domain of the processor is specified to be fully operational without breakdown. Note that this Tj can be fixed, e.g., in non-volatile storage or fuse logic. However, this throttle point can be configurable, e.g., by software or firmware to a value lower than Tj. In this way, an original equipment manufacturer (OEM) can dial down the throttle point as a function of Tj (e.g., using basic input/output system (BIOS)). As an example and not for purposes of limitation, for a multicore processor the throttle point for a core domain can be set at between approximately 80 and 110 degrees Celsius (and may be set between approximately the same or a different range for a non-core domain). In some embodiments, this throttle point can be determined by testing, e.g., during fabrication, and stored in a non-volatile storage or other mechanism of the processor. However, in other embodiments the throttle point can be dynamically changed, e.g., based on a history of the semiconductor product such that the throttle point can be reduced as the product ages due to various degradation mechanisms of the semiconductor product.

Note that this throttle point can be reached at different performance levels of a processor. For example, according to an operating system (OS)-based mechanism, namely the Advanced Configuration and Platform Interface (ACPI) standard (e.g., Rev. 3.0b, published Oct. 10, 2006), a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. At any of these performance states, and more likely in a P0 or P1 state, the throttle point may be reached.

If it is determined that the core domain temperature is greater than this throttle point, control passes to block 140 where a frequency of the core domain can be reduced by a selected amount. This reduction in frequency in turn causes the power consumption of the domain also to decrease, leading to a decrease in the domain's temperature. As one example, the selected amount may correspond to a degradation of a predetermined amount of a frequency bin. For example, the core domain frequency can be reduced by 1/N of a bin frequency. As used herein, a "bin frequency" corresponds to a smallest multiple by which a domain frequency can be updated. In some embodiments this bin frequency can be an integer multiple of a bus clock frequency, although the scope of the present invention is not limited in this regard.

Note that in many implementations, rather than performing frequency reductions by less than a bin frequency amount, embodiments allow for multiple iterations of the frequency control algorithm of FIG. 1 to be performed, and a count maintained of the number of 1/N reductions. Then at a natural bin boundary, which corresponds to N/N reductions, an actual frequency reduction to the given domain can be performed. In general, this frequency reduction can be performed using frequency control logic of the PCU, which can cause the given domain to have its frequency reduced. As an example, this frequency reduction process includes stopping all useful work of the domain, draining transactions pending in the domain, applying the new frequency (and possibly a new voltage) to the domain, and then resuming normal operation in that domain at the new frequency/voltage. Thus as seen, certain complexity is involved in a frequency change and furthermore this frequency change can take some amount of time. Temperature change can lag a frequency change and the amount of such time lag is a function of the thermal capacitance of the cooling solution deployed. By controlling the rate of frequency change to match the thermal capacitance of the cooling solution, control loop oscillations and fluctuations in frequency and temperature can be avoided. Accordingly, by only performing such frequency changes upon reaching a natural bin boundary, greater efficiency can be realized. This count of iterations at which a frequency is to be reduced by a 1/N amount can be stored, e.g., in a temporary storage such as a register, counter or other such storage. When the value in this counter thus reaches an integral amount, an actual frequency change can be performed.

Note that the mechanism to reduce the core domain frequency can be performed in different manners. For example, frequency control logic of the PCU can receive an instruction to update the core domain frequency. In turn, the frequency control logic may select various instructions to be sent to cause the frequency to be reduced. For example, various control signals can be sent to one or more phase lock loops (PLLs) or other frequency control mechanisms to cause the frequency to be reduced. After this frequency change, control passes to block 180, where a check for temperature of another domain can begin.

If instead at diamond 120 it is determined that the core domain temperature is not greater than the throttle point, control passes next to diamond 130, where it can be determined whether the graphics domain temperature is greater than a sum of the throttle point (for the graphics domain) and a cross-domain margin. Thus as discussed above, a temperature of one domain can affect the temperature of another domain. And accordingly, if the graphics domain temperature is greater than this sum of throttle point and cross-domain margin, the same adjustment to the core domain frequency can be performed, namely a reduction by a selected amount occurs at block 140. Of course, a different amount of reduction can be effected in this case, e.g., 1/X of a bin frequency. Note that both X and N are independent parameters that can be stored in non-volatile storage.

Otherwise, there is no potential thermal violation and accordingly the current frequency of the core domain can be maintained. Thus at this point, control passes to diamond 150, where an analysis with regard to the graphics domain temperature can be made. As seen, this determination can also be reached if the domain under review is the graphics domain. Thus at diamond 150 it can be determined whether the graphics domain temperature is greater than a throttle point. If so, control passes to block 170 where the graphics domain frequency can be reduced by a selected amount. Note that this reduction in graphics domain frequency can proceed as discussed above with regard to block 140. For example, the graphics frequency can be reduced by 1/N of a bin frequency. Note that the different domains can have different bin frequencies. Control thereafter passes back to block 180 discussed above.

Still referring to FIG. 1, if instead it is determined that the graphics domain temperature is not greater than the throttle point, control passes from diamond 150 to diamond 160 where it can be determined whether the core domain temperature is greater than a sum of the throttle point and the cross-domain margin. If so, the graphics domain frequency can be reduced at block 170. Otherwise, control passes back for further analysis of the core domain at diamond 120.

Thus as seen, FIG. 1 proceeds in an iterative manner where both domain temperatures are iteratively analyzed. Although shown with this particular implementation in the embodiment of FIG. 1, understand the scope of the present invention is not limited in this regard.

Note that the value of N can be a tunable or programmable parameter that determines the rate of cooling achieved by thermal throttling in accordance with an embodiment of the present invention. For a small value of N (e.g., less than approximately 2), the rate at which the frequency can be reduced is faster than for a larger value of N. However, such smaller N values may lead to oscillations in which a domain can be overcooled. In some embodiments, the value of N may be programmable, e.g., by a user using a user-level instruction. In other embodiments, the value of N can be configured via a configuration register or stored in a non-volatile storage, e.g., of the PCU.

Thus in a multi-domain processor, embodiments can enable thermal control such that not only does a domain that is operating above its thermal specification have its temperature reduced, but at least one other domain within the same die can have its temperature reduced. In this way, the contribution to thermal heating of the domain under consideration by another domain can be reduced or removed.

Figure 2:
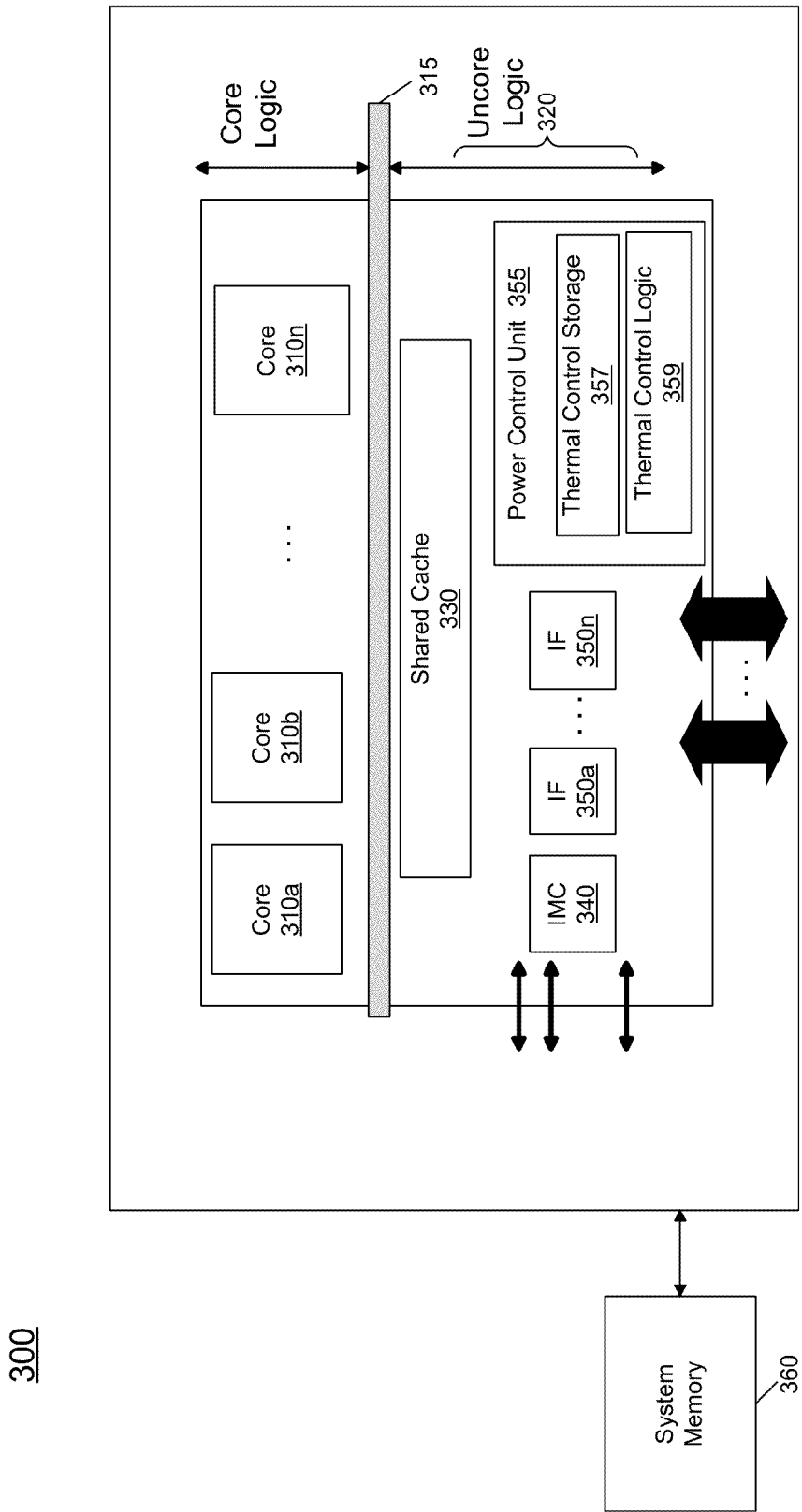
FIG. 2 is a block diagram of a processor in accordance with an embodiment of the present invention.

Referring now to FIG. 2, shown is a block diagram of a processor in accordance with an embodiment of the present invention. As shown in FIG. 2, processor 300 may be a multicore processor including a plurality of cores $310_a$-$310_n$. In one embodiment, each such core may be of an independent power domain and can be configured to operate at an independent voltage and/or frequency, and to enter a turbo frequency mode when available headroom exists. The various cores may be coupled via an interconnect 315 to a system agent or uncore 320 that includes various components. As seen, the uncore 320 may include a shared cache 330 which may be a last level cache. In addition, the uncore may include an integrated memory controller 340, various interfaces 350 and a power control unit 355.

In various embodiments, power control unit 355 may include a thermal control logic 359, which may be a logic to control domain frequencies based on temperature not only on the domain to be controlled, but also other domains of the processor. In the embodiment of FIG. 2, assuming that each core is of an independent power domain, logic 359 can dynamically determine whether a temperature has exceeded a throttle point and/or a sum of a throttle point and cross-domain margin, and if so to perform frequency control in accordance with an embodiment of the present invention. As further seen in FIG. 2 to provide for storage of different values for use in thermal control, a thermal control storage 357 may further be present within PCU 355 to store values such as the Tj and/or throttle points, cross-domain margin, and N. Although shown at this location in the embodiment of FIG. 2, understand that the scope of the present invention is not limited in this regard and the storage of this information can be in other locations, such as configuration registers, non-volatile storage or the like.

With further reference to FIG. 2, processor 300 may communicate with a system memory 360, e.g., via a memory bus. In addition, by interfaces 350, connection can be made to various off-chip components such as peripheral devices, mass storage and so forth. While shown with this particular implementation in the embodiment of FIG. 2, the scope of the present invention is not limited in this regard.

Figure 3:
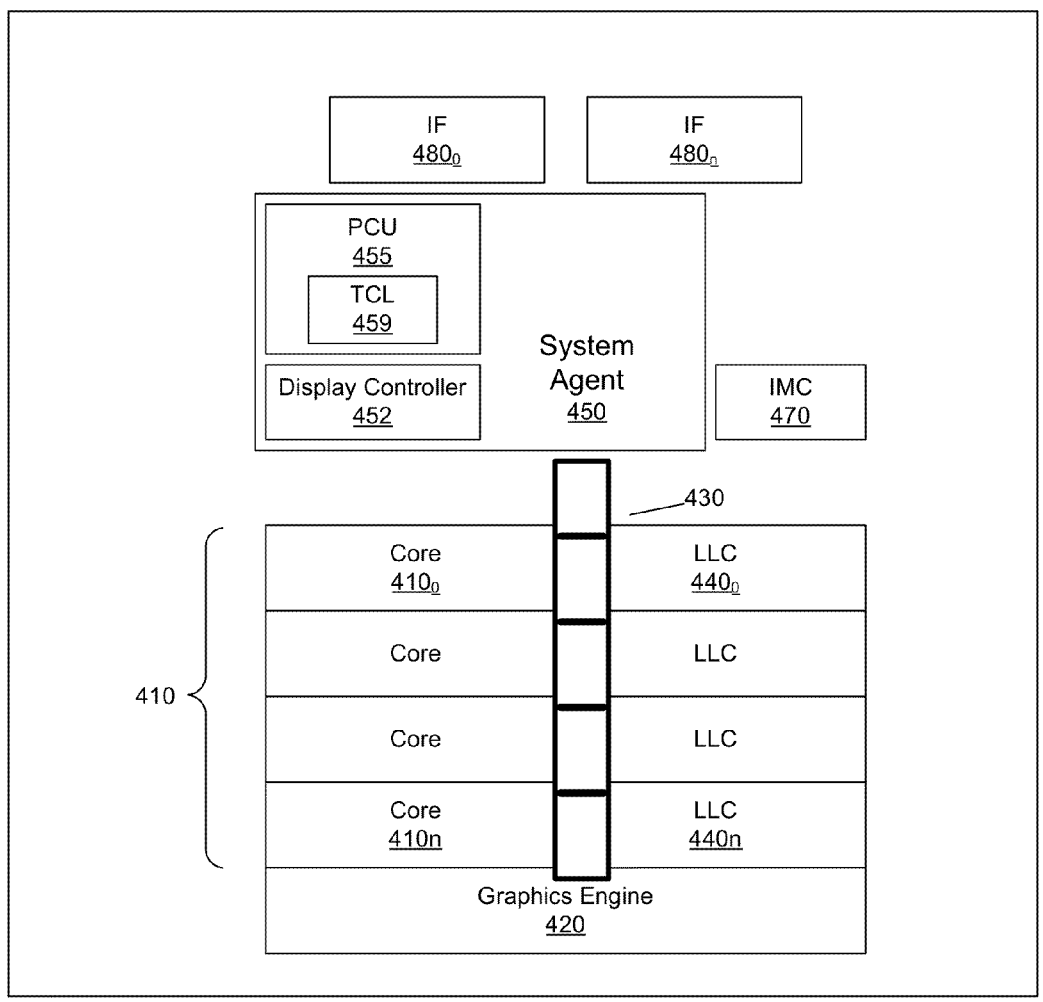
FIG. 3 is a block diagram of a multi-domain processor in accordance with another embodiment of the present invention.

Referring now to FIG. 3, shown is a block diagram of a multi-domain processor in accordance with another embodiment of the present invention of the present invention. As shown in the embodiment of FIG. 3, processor 400 includes multiple domains. Specifically, a core domain 410 can include a plurality of cores 410a-410n, a graphics domain 420 can include one or more graphics engines, and a system agent domain 450 may further be present. In various embodiments, system agent domain 450 may execute at a fixed frequency and may remain powered on at all times to handle power control events and power management such that domains 410 and 420 can be controlled to dynamically change frequency based on thermal events occurring on one or the other domain in accordance with an embodiment of the present invention.

Each of domains 410 and 420 may operate at different voltage and/or power. Note that while only shown with three domains, understand the scope of the present invention is not limited in this regard and additional domains can be present in other embodiments. For example, multiple core domains may be present each including at least one core.

In general, each core 410 may further include low level caches in addition to various execution units and additional processing elements. In turn, the various cores may be coupled to each other and to a shared cache memory formed of a plurality of units of a last level cache (LLC) $440_0$-$440_n$. In various embodiments, LLC 450 may be shared amongst the cores and the graphics engine, as well as various media processing circuitry. As seen, a ring interconnect 430 thus couples the cores together, and provides interconnection between the cores, graphics domain 420 and system agent circuitry 450.

In the embodiment of FIG. 3, system agent domain 450 may include display controller 452 which may provide control of and an interface to an associated display. As further seen, system agent domain 450 may include a power control unit 455 which can include a frequency control logic 459 in accordance with an embodiment of the present invention. In various embodiments, this logic may execute algorithms such as shown in FIG. 1 to thus dynamically control frequency based on thermal events occurring on at least one of the core and graphics domains.

As further seen in FIG. 3, processor 400 can further include an integrated memory controller (IMC) 470 that can provide for an interface to a system memory, such as a dynamic random access memory (DRAM). Multiple interfaces $480_0$-$480_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with a Intel® Quick Path Interconnect (QPI) protocol may also be provided. Although shown at this high level in the embodiment of FIG. 3, understand the scope of the present invention is not limited in this regard.

Figure 4:
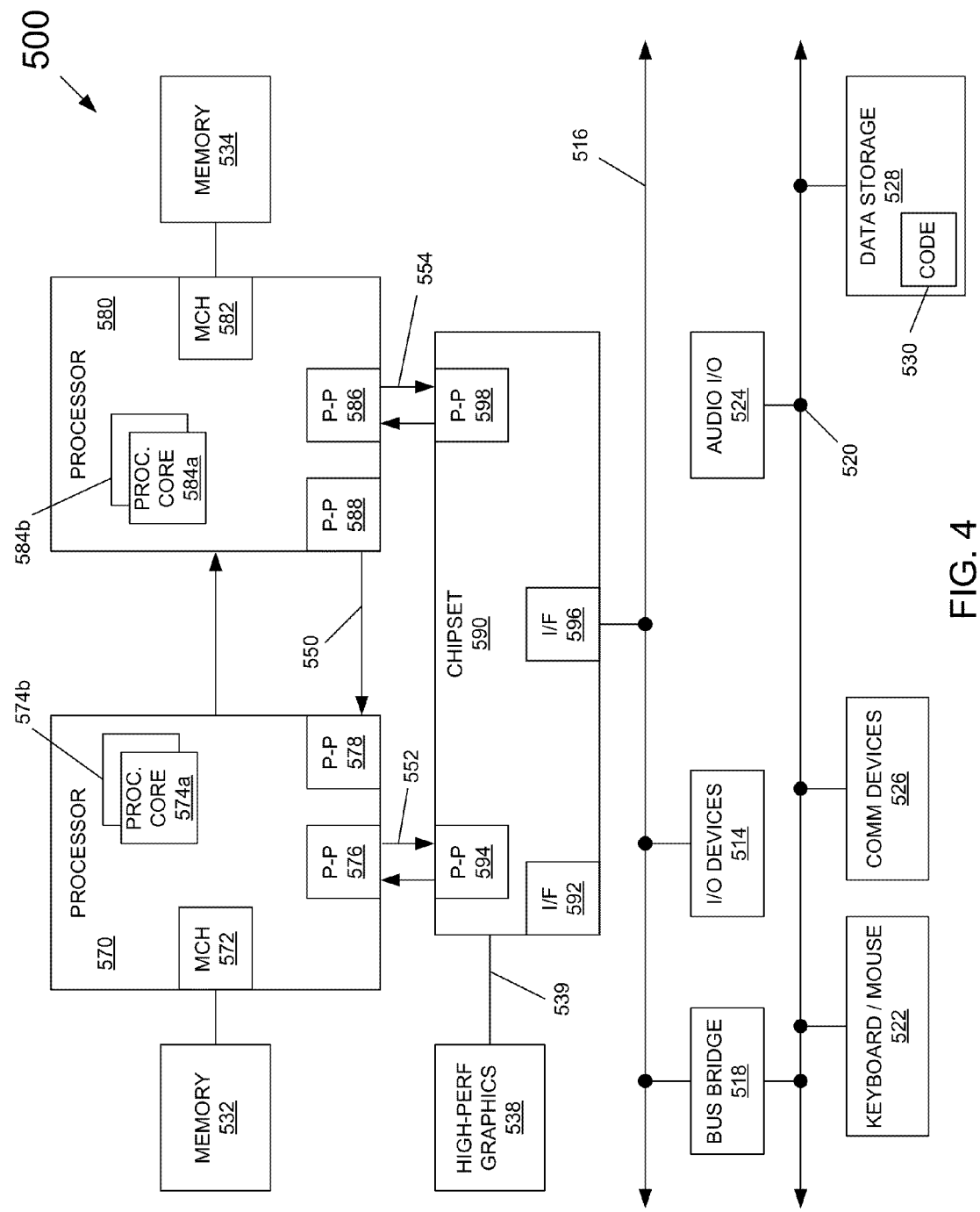
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b), although potentially many more cores may be present in the processors. Each of the processors can include a PCU or other logic to perform dynamic frequency control of a domain of the processor based on thermal events of multiple domains, as described herein.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of system memory (e.g., DRAM) locally attached to the respective processors. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 4, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Embodiments can be incorporated into other types of systems including mobile devices such as a smart cellular telephone, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    a first domain located on a die and including at least one core to execute instructions;
    a second domain located on the die and including at least one functional unit to execute a specialized function, wherein the first and second domains can operate at independent frequencies; and
    a power control unit (PCU) coupled to the first and second domains, the PCU including a thermal logic to cause a reduction in a frequency of the first domain by a frequency bin of the processor based on a value of a counter for the first domain in response to a temperature of the second domain exceeding a sum of a throttle threshold for the second domain and a cross-domain margin, wherein the thermal logic is, for each of a plurality of iterations, to update the counter value for the first domain when the second domain temperature is determined to exceed the sum, wherein the cross-domain margin is a programmable temperature margin parameter stored in a configuration non-volatile storage of the processor accessible to the thermal logic and corresponds to a marginal level above the throttle threshold for the second domain at which a power consumption of the first domain is to be reduced to allow the temperature of the second domain to be reduced, the frequency bin corresponding to a smallest multiple by which the first domain frequency can change.

2. The processor of claim 1, wherein the thermal logic is to cause the first domain frequency to be reduced by the frequency bin of the processor when the counter value is equal to N, wherein N is a programmable parameter.

3. The processor of claim 1, wherein the thermal logic is, for each of a plurality of iterations, to update a value of a counter for the first domain when a temperature of the first domain is determined to exceed a throttle threshold for the first domain.

4. The processor of claim 2, where N is controllable by a user.

5. The processor of claim 1, wherein the thermal logic is to cause the reduction in the first domain frequency if a temperature of the first domain is greater than a throttle threshold for the first domain.

6. The processor of claim 1, wherein the thermal logic is to cause a reduction in a frequency of the second domain in response to a temperature of the first domain exceeding a sum of a throttle threshold for the first domain and the cross-domain margin.

7. The processor of claim 1, wherein the processor includes the configuration non-volatile storage to store the throttle threshold and the cross-domain margin, wherein the throttle threshold is of a different value than a junction temperature of the processor.

8. A method comprising:
    determining, in a controller of a multi-domain processor, whether a temperature of a second domain of the multi-domain processor is greater than a sum of a throttle threshold for the second domain and a cross-domain margin, wherein the cross-domain margin is a programmable temperature margin parameter stored in a non-volatile storage of the multi-domain processor and corresponds to a marginal level above the throttle threshold for the second domain at which a power consumption of a first domain of the multi-domain processor is to be reduced to allow the temperature of the second domain to be reduced;
    updating a value of a counter for the first domain when the second domain temperature is determined to exceed the sum, and updating the counter value when the first domain is determined to exceed a throttle threshold for the first domain; and
    reducing a frequency of the first domain by a frequency bin of the first domain when the counter value equals N, otherwise maintaining a current frequency of the first domain.

9. The method of claim 8, further comprising reducing the first domain frequency if a temperature of the first domain is greater than a throttle threshold for the first domain.

10. The method of claim 8, further comprising:
    determining whether a temperature of the first domain is greater than the sum of a throttle threshold for the first domain and the cross-domain margin; and
    if so, reducing a frequency of the second domain by a second selected amount, otherwise maintaining a current frequency of the second domain.

11. A system comprising:
    a multi-domain processor including a core domain having a plurality of cores, a non-core domain including at least one processing engine, and a system agent domain including a power controller, wherein the power controller is to reduce a frequency of the core domain by a selected amount when a temperature of the non-core domain is greater than a sum of a throttle threshold and a cross-domain margin for the non-core domain, wherein the cross-domain margin is a programmable temperature margin parameter stored in a non-volatile storage of the multi-domain processor and corresponds to a marginal level above the throttle threshold for the non-core domain at which a power consumption of the core domain is to be reduced to allow the temperature of the non-core domain to be reduced, and otherwise to maintain a current frequency of the core domain, wherein the power controller is to update a value of a counter for the core domain when the non-core domain temperature is determined to exceed the sum, and to reduce the core domain frequency by a bin frequency when the counter value equals N, the frequency bin corresponding to a smallest multiple by which the core domain frequency can change.

12. The system of claim 11, wherein the power controller is to reduce the frequency of the core domain after a plurality of iterations in which it is determined that the non-core domain temperature is greater than the sum.

13. The system of claim 11, wherein the power controller is to reduce the frequency of the core domain after a plurality of iterations in which it is determined that the non-core domain temperature is greater than the throttle threshold for the non-core domain.

14. The processor of claim 2, wherein the thermal logic is, for each of a plurality of iterations, to update the value of the counter for the first domain when a temperature of the first domain is determined to exceed a throttle threshold for the first domain, and to cause the reduction in the first domain frequency by the frequency bin of the processor when the counter value is equal to X, wherein X and N are different values to be stored in a storage of the processor.

* * * * *